(12) United States Patent
Simon et al.

(10) Patent No.: US 7,472,148 B2
(45) Date of Patent: Dec. 30, 2008

(54) METHOD AND APPARATUS FOR RANDOM-NUMBER GENERATOR

(75) Inventors: Harris S. Simon, Poway, CA (US); Kenneth Andrew Van Pelt, San Diego, CA (US); Dale Ogden Sharp, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 559 days.

(21) Appl. No.: 10/897,589

(22) Filed: Jul. 23, 2004

(65) Prior Publication Data

US 2006/0020647 A1 Jan. 26, 2006

(51) Int. Cl.
*G06F 1/02* (2006.01)

(52) U.S. Cl. ..................................... 708/250

(58) Field of Classification Search .......... 708/250–256
See application file for complete search history.

(56) References Cited

U.S. PATENT DOCUMENTS

| | | | |
|---|---|---|---|
| 4,853,884 A | 8/1989 | Brown et al. | |
| 5,506,795 A * | 4/1996 | Yamakawa | 708/250 |
| 6,195,669 B1 * | 2/2001 | Onodera et al. | 708/250 |
| 6,687,721 B1 * | 2/2004 | Wells et al. | 708/250 |
| 6,691,141 B2 * | 2/2004 | Schmidt | 708/250 |
| 6,965,907 B2 * | 11/2005 | Klass | 708/255 |
| 7,266,575 B2 * | 9/2007 | Ikeda | 708/250 |
| 2002/0184273 A1 * | 12/2002 | Katsuori | 708/250 |
| 2004/0139132 A1 * | 7/2004 | Lutkenhaus et al. | 708/250 |
| 2006/0010182 A1 * | 1/2006 | Altepeter et al. | 708/250 |

FOREIGN PATENT DOCUMENTS

| | | |
|---|---|---|
| DE | 19500599 | 7/1996 |
| DE | 10219163 | 11/2003 |
| EP | 0903665 A2 | 3/1999 |
| JP | 2003-108364 | 4/2003 |

OTHER PUBLICATIONS

Chua-Chin et al., Switched-current 3-bit CMOS wideband random signal generator, 2003, IEEE, pp. 186-189.*
Thomas et al., A Fast and Compact Quantum Random Number Generator, Apr. 2000, American Institute of Physics, pp. 1675-1680.*

(Continued)

*Primary Examiner*—Chat C Do
(74) *Attorney, Agent, or Firm*—Abdollah Katbab; Won Tae C. Kim; Thomas R. Rouse

(57) ABSTRACT

Method and apparatus for generating random numbers are disclosed. In one aspect, a method for generating random numbers for use in a wireless communication device provides for generating random numbers, gathering a sample of the generated random numbers, and computing at least one metric, such as mean value, standard deviation, and/or entropy. The method further provides for comparing the metric with a corresponding reference value and adjusting the metric based on a result of said comparison so that the generated random numbers achieve a desired distribution. In another aspect, an apparatus for generating random numbers includes an analog noise generator and hardware components for generating random numbers and feedback values to adjust the random numbers. The apparatus further includes a processor capable of executing instructions to carry out control algorithms for adjusting the random numbers.

36 Claims, 5 Drawing Sheets

OTHER PUBLICATIONS

Kinniment et al., Design of an On-Chip Random Number Generator using Metastability, 2002, ESSCIRC, pp. 595-598.*

Mads Haadr, Introduction to Randomness and Random Numbers, Jun. 1999, http://www.random.org/essay.html.*

Bucci M., et al., "A High Speed Truly IC Random Number Source for Smart Card Microcontrollers," IEEE, vol. 1, pp. 239-242, Sep. 15, 2002.

International Search Report—PCT/US05/025610, International Search Authority—European Patent Office—Oct. 18, 2005.

* cited by examiner

METHOD AND APPARATUS FOR RANDOM-NUMBER GENERATOR

STATEMENT REGARDING FEDERALLY SPONSORED RESEARCH OR DEVELOPMENT

The described embodiments were made with government support under United States government contract MDA904-01-G-0620/J.O. 0002 awarded by the National Security Agency (NSA), Maryland Procurement Office. The government may have certain rights in these described embodiments.

FIELD

The present invention relates to random number generators. More specifically, the present invention relates to methods and apparatus for stable, consistent, self-calibrating random number generators for high-volume production of wireless communication devices.

BACKGROUND

In wireless communications terminals or devices, there is a need for random-number generators, e.g., for cryptographic applications. However, variations in the operating conditions (such as changes in temperature, voltage and current) and variations in component characteristics (due to inconsistencies in component manufacturing, aging, shelf life and operational life) cause existing random-number generators to vary in the performance of generating random numbers. Consequently, similar devices manufactured to perform uniformly fluctuate in their performance because the constituent random-number generators vary in their characteristics and; thus, produce different random-number distributions.

There is a need, therefore, for random-number generators that perform uniformly in spite of variations in component characteristics, operating conditions, and environment. There is also a need for similarly manufactured devices to operate similarly and show uniform and consistent performance.

SUMMARY

The disclosed embodiments provide novel and improved methods and apparatus for generating random numbers. In one aspect, a method for generating random numbers for use in a wireless communication device provides for generating random numbers and gathering a sample of the generated random numbers. The method further provides for computing at least one metric, such as mean value, standard deviation, and/or entropy, based on the gathered sample, and comparing the metric with a corresponding reference value. The method further provides for adjusting the metric based on a result of the comparison so that the generated random numbers achieve a desired distribution.

In another aspect, an apparatus for generating random numbers includes an analog noise generator and hardware components for generating random numbers and feedback values to adjust the random numbers and their distribution. The apparatus further includes a processor capable of executing instructions to carry out control algorithms for adjusting the random numbers and their distribution.

BRIEF DESCRIPTION OF THE DRAWINGS

The features and advantages of the present invention will become more apparent from the detailed description of the embodiments in connection with the drawings set forth below.

DETAILED DESCRIPTION

Figure 1:
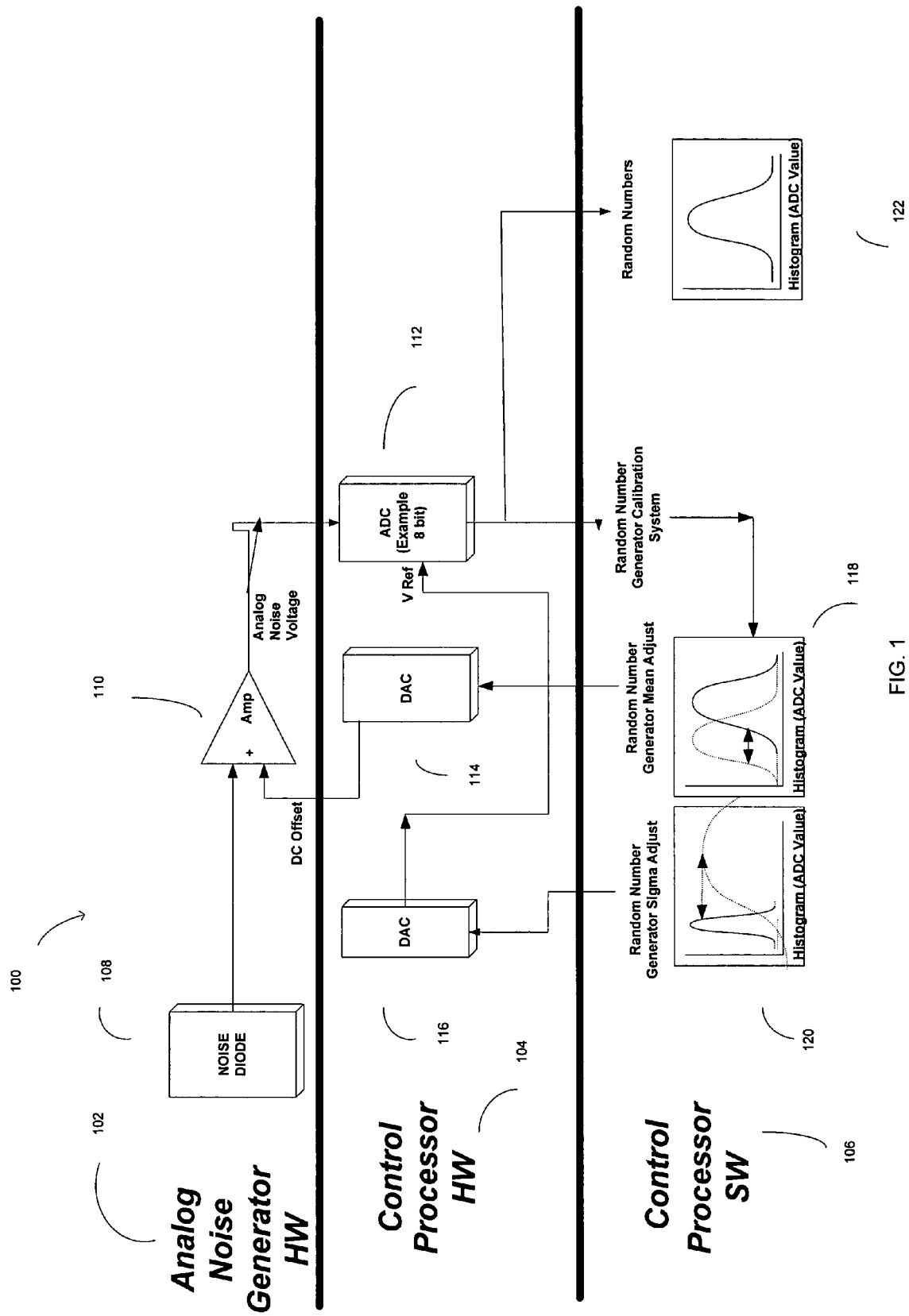
FIG. 1 illustrates a block diagram of a random-number generator.

Before several embodiments are explained in detail, it is to be understood that the scope of the invention should not be limited to the details of the construction and the arrangement of the components set forth in the following description or illustrated in the drawings. Also, it is to be understood that the phraseology and terminology used herein is for the purpose of description and should not be regarded as limiting.

FIG. 1 illustrates a block diagram of an automatic self-adjusting random-number generator 100, according to one embodiment. Random-number generator 100 generally includes analog noise generator hardware 102, control processor hardware 104, and control processor software module 106. Analog noise generator hardware 102 provides a random analog voltage that is normally distributed with a mean value X and a standard deviation S. Analog noise generator hardware 102 may also include a noise diode 108 and an amplifier 110 for signal conditioning, according to one embodiment. The noise diode may be used in its reverse breakdown region, biased to operate on the "knee" of this part of the operating characteristic. When the diode is operated in this region, the AC voltage at its terminals is a Gaussian distribution with flat spectral density over its bandwidth.

The control processor hardware 104 includes an ADC (analog to digital converter) 112, a CPU (central processing unit) or computer, and DACs (digital to analog converters) 114 and 116. The ADC 112 quantizes the normally distributed analog noise voltage based on the voltage reference (V-Ref) value and generates random numbers. The CPU in conjunction with the control software module computes at least one metric, based on a sample of the quantized noise voltage, e.g., random numbers, adjusts the reference voltage (V-Ref) input to the ADC 112, and the DC offset input of the amplifier 110, in order to "fit" the distribution of the random numbers into the full range "window" of the ADC's capability. The DC offset represents the mean X of the random numbers, and the reference voltage (V-Ref) represents the standard deviation of the random numbers. The ADC reference voltage corresponds to the full-scale quantization capability of the ADC, i.e., it sets the maximum voltage into the ADC that can be digitized without over scaling the converter. Thus, adjusting the reference voltage is directly proportional to the peak-to-peak voltage conversion of the ADC.

According to one embodiment, control processor software module 106 operates on a sample of random numbers produced by the ADC 112 and computes the mean X and the standard deviation S of the chosen sample for feeding back into the DACs 114 and 116, respectively. The mean value X is used to control the location of the peak of the histogram of the random numbers generated by the ADC 112, as shown by the waveform 118. The standard deviation S is used to control the width of the histogram of the random numbers generated by the ADC 112, as shown by the waveform 120.

In typical random-number generator systems, where only a few are being built and the operating environment is quasistatic, the systems may be adjusted by changing their parts to achieve consistent random-number distribution across all systems. However, in a high-volume production, such as mobile phones, there is a need for automatic adjustment capability that provides for consistent random-number distribution across high-volume production and under varying operating conditions.

Figure 2:
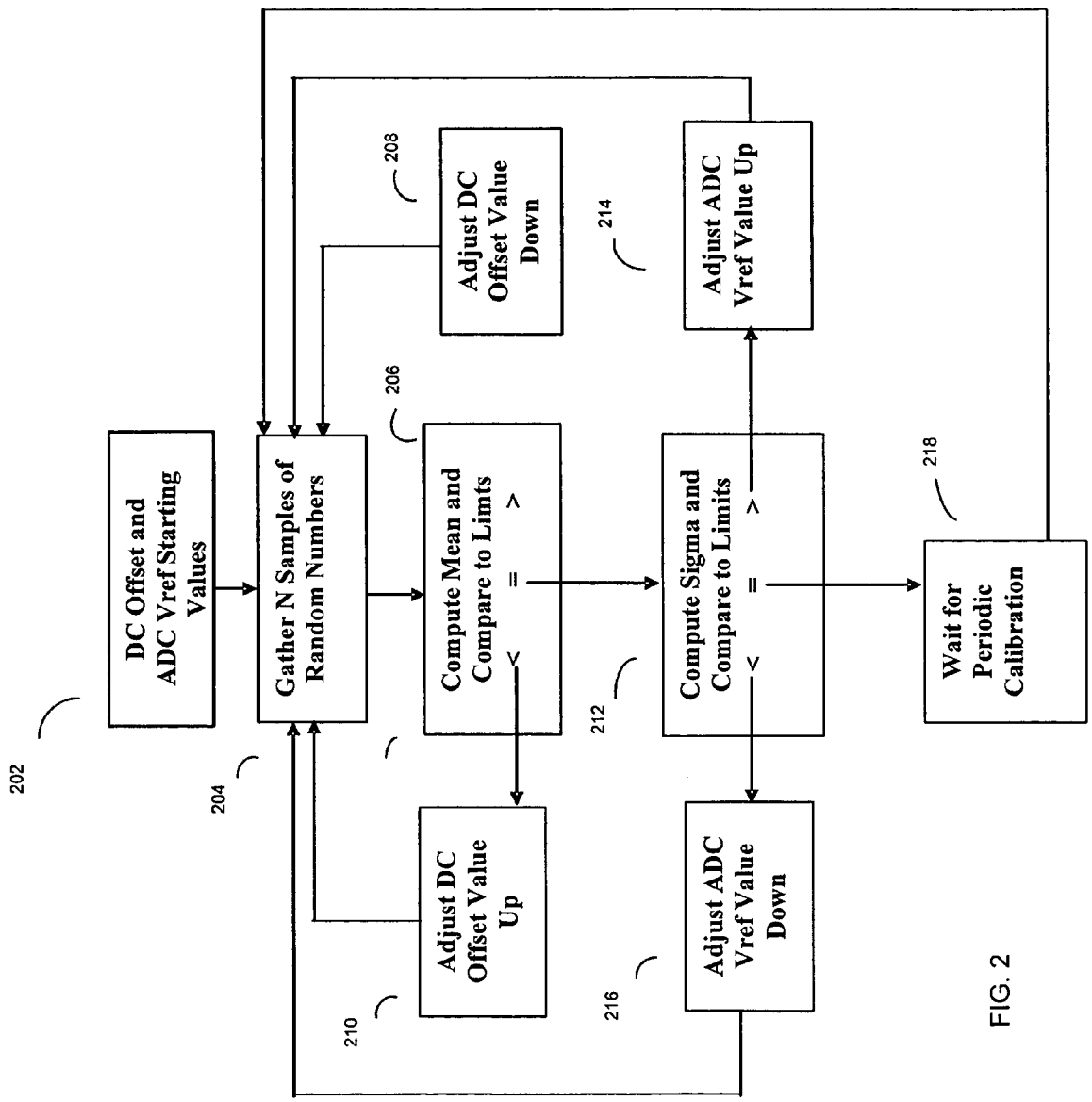
FIG. 2 illustrates a flow chart for generating random numbers.

FIG. 2 illustrates a flow chart for adjusting random-number distributions, according to one embodiment. In step 202, some initial values for the DC offset and reference voltage (V-Ref) are chosen, which may be the final values obtained when the random-number generator was last adjusted. In step 204, a sample of the random numbers produced by the ADC 112 is selected. In step 206, the mean value of the selected sample of random numbers is computed and compared to a reference mean value. The reference mean value may be chosen based on the ADC bit width of the random-number generator. For example, for an 8-bit ADC, the reference or desired mean value would be 127 to conform to a desired Gaussian random-number histogram 122. The reference mean value of 127 corresponds to the midpoint of the 8-bit ADC range. Based on the comparison conducted in step 206, the DC offset value input to the amplifier 110 is adjusted, in step 208 or 210, as the case may be, through some linear, nonlinear, or adaptive control algorithm well known in the art.

Similarly, in step 212, the standard deviation value of the selected sample of random numbers is computed and compared to a reference standard deviation value. The reference standard deviation value may be chosen based on the accuracy or ADC full scale value of the random-number generator. For example, for an 8-bit ADC 112, the reference or desired standard deviation value would be about 42 to conform to the desired Gaussian random-number histogram 122. The reference standard-deviation value of 42 corresponds to about one-sixth of the 8-bit ADC range, providing a random-number distribution of six sigma in the ADC. Based on the comparison conducted in step 212, the input to the DAC 116 is adjusted, in step 214 or 216, as the case may be, through some linear, nonlinear, or adaptive control algorithm well known in the art.

Figure 3:
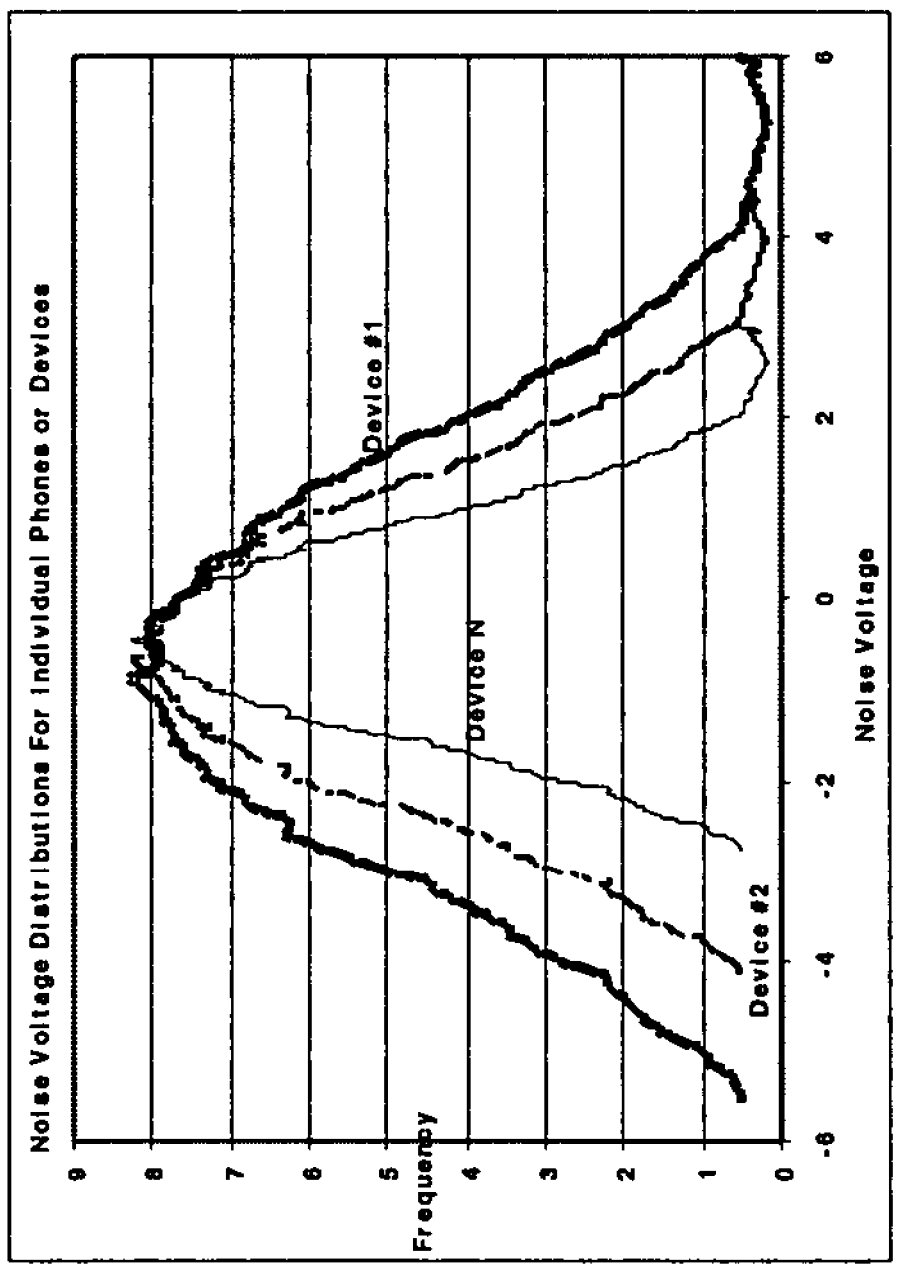
FIG. 3 illustrates noise voltage waveforms for similarly manufactured devices.

FIG. 3 illustrates three noise voltage waveforms generated by three similarly manufactured devices. These noise voltages waveforms correspond to the signals generated at the output of the respective amplifiers 110. These waveforms generally have different mean and standard deviation values, because of the difference in the constituent component characteristics, operating conditions, and environment.

Figure 4:
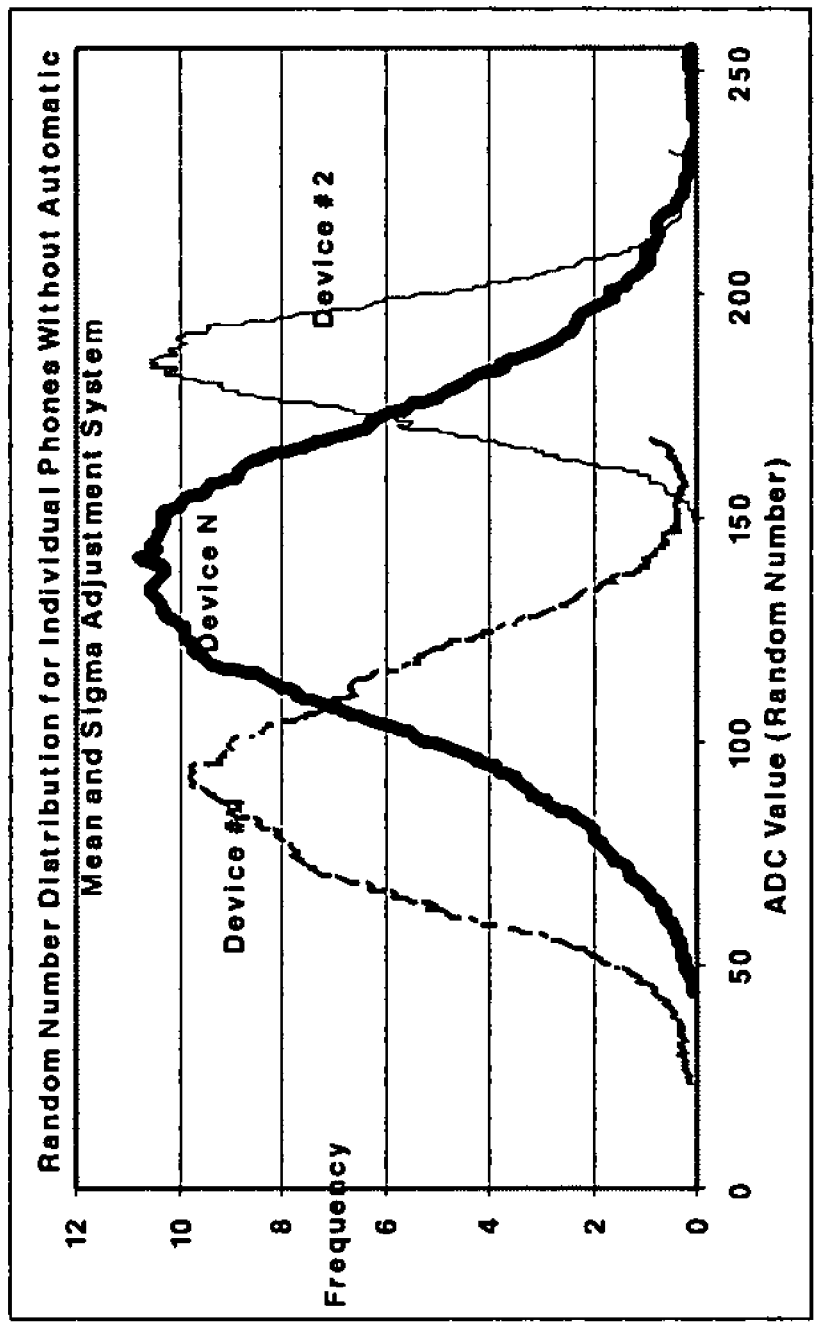
FIG. 4 illustrates random-number distributions for similarly manufactured devices without adjustment.

FIG. 4 illustrates three random-number distributions for the three similarly manufactured devices mentioned above in connection with FIG. 3, without automatic adjustment. These random-number distributions correspond to the random-numbers generated at the output of the respective ADCs 112. They still have different mean and standard deviation values.

Figure 5:
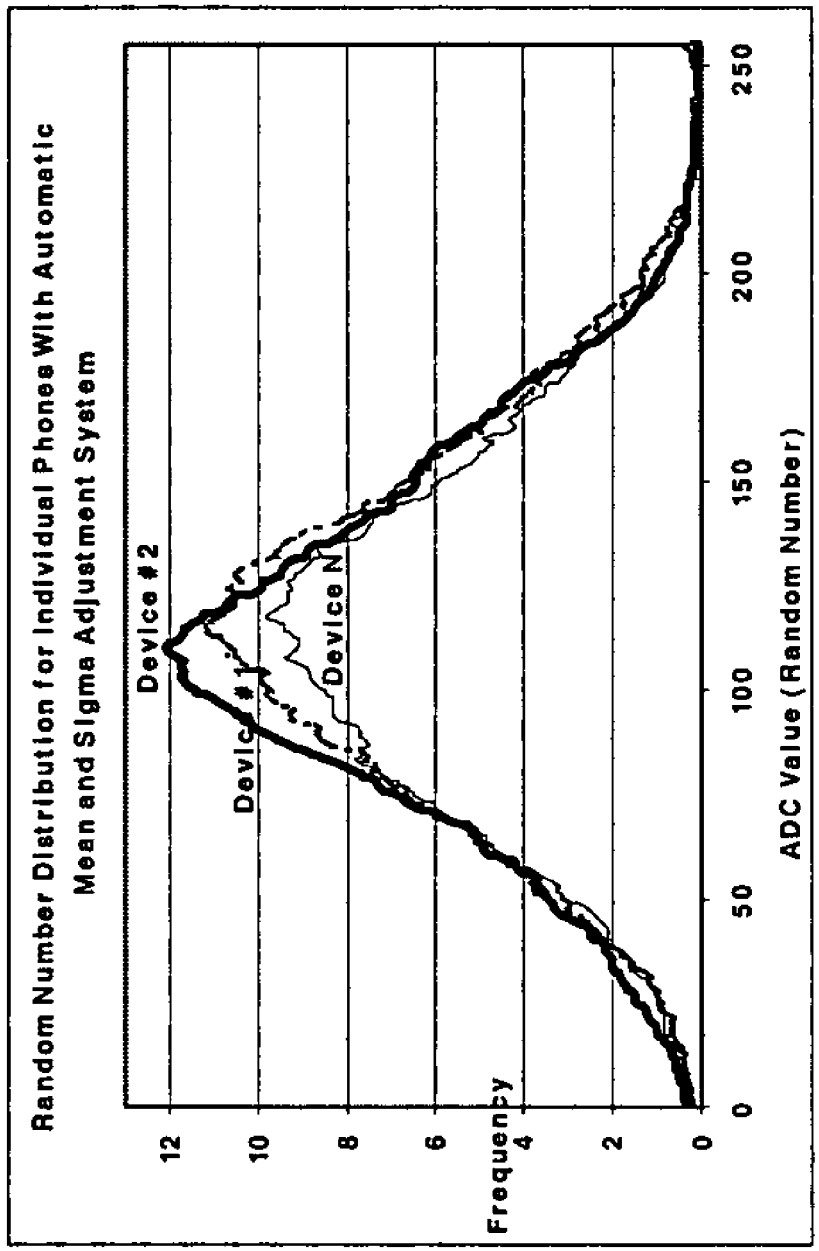
FIG. 5 illustrates similar random-number distributions for similarly manufactured devices with automatic adjustment.

FIG. 5, however, illustrates three uniform random-number distributions for the similarly manufactured devices mentioned above in connection with FIG. 3, with automatic adjustment mechanism. These random-number distributions correspond to the random numbers generated at the output of the respective ADCs 112. They desirably have same, or very close, mean and standard deviation values, in spite of the difference in their constituent component characteristics, operating conditions, and environment.

Therefore, the control processor and software module disclosed herein adjust the random-number generator to produce similar random-number distributions across numerous similarly manufactured devices under varying operating conditions. For example, after the mean and sigma adjustment criteria have been met, the random-number generator is considered calibrated and ready to provide random numbers for the desired application with metrics that are consistent over initial production, environmental variations and life cycle of the product.

In another embodiment, additional metrics such as entropy, which indicates how much randomness exists in the generated random numbers, may also be computed and adjusted for adjusting the performance of the random-number generator.

Those of skill in the art would understand that information and signals may be represented using any of a variety of different technologies and protocols. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e. g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a MS-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e. g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein.

The invention claimed is:

1. A method for generating random numbers for use in a wireless communication device, the method comprising:
generating random numbers having an adjustable distribution based on at least one adjustable input value;
gathering a sample of the generated random numbers;
computing at least one metric based on the sample;
comparing the metric with a corresponding reference value; and
adjusting the adjustable input value based on a result of said comparing so that the generated random numbers achieve a desired distribution;
wherein adjusting the adjustable input value based on said comparing comprises:
adjusting a dc offset value for generating an analog noise voltage to cause the generated random numbers to achieve a desired numeric mean; and
adjusting a reference voltage value to cause the generated random numbers to achieve a desired numeric range.

2. The method of claim 1, wherein said metric includes a mean value.

3. The method of claim 1, wherein said metric includes a standard deviation value.

4. The method of claim 1, wherein said metric includes an entropy value.

5. The method of claim 1, wherein said adjusting includes adjusting the adjustable input value through a linear algorithm.

6. The method of claim 1, wherein said adjusting includes adjusting the adjustable input value through a nonlinear algorithm.

7. The method of claim 1, wherein said adjusting includes adjusting the adjustable input value through an adaptive algorithm.

8. The method of claim 1, wherein computing at least one metric based on the sample comprises:
computing a first metric representing a mean value of the random sample; and
computing a second metric representing a standard deviation of the random sample.

9. The method of claim 1, wherein the desired distribution is a Gaussian distribution having a mean value corresponding to a center value of a range for the random numbers.

10. An apparatus for generating random numbers in a wireless communication device, comprising:
means for generating random numbers having an adjustable distribution based on at least one adjustable input value;
means for gathering a sample of the generated random numbers;
means for computing at least one metric based on the sample;
means for comparing the metric with a corresponding reference value; and
means for adjusting the adjustable input value based on a result of said comparing so that the generated random numbers achieves a desired distribution;
wherein the means for adjusting the adjustable input value based on said comparing comprises:
means for adjusting a dc offset value for generating an analog noise voltage to cause the generated random numbers to achieve a desired numeric mean; and
means for adjusting a reference voltage value to cause the generated random numbers to achieve a desired numeric range.

11. The apparatus of claim 10, wherein said metric includes a mean value.

12. The apparatus of claim 10, wherein said metric includes a standard deviation value.

13. The apparatus of claim 10, wherein said metric includes an entropy value.

14. The apparatus of claim 10, wherein said means for adjusting includes means for adjusting the adjustable input value through a linear algorithm.

15. The apparatus of claim 10, wherein said means for adjusting includes means for adjusting the adjustable input value through a nonlinear algorithm.

16. The apparatus of claim 10, wherein said means for adjusting includes means for adjusting the adjustable input value through an adaptive algorithm.

17. The apparatus of claim 10, wherein the means for computing at least one metric based on the sample comprises:
means for computing a first metric representing a mean value of the random sample; and
means for computing a second metric representing a standard deviation of the random sample.

18. The apparatus of claim 10, wherein the desired distribution is a Gaussian distribution having a mean value corresponding to a center value of a range for the random numbers.

19. A computer-readable medium embodying means for implementing a method for generating random numbers in a wireless communication device, the method comprising:
computing at least one metric based on a sample of randomly generated numbers having an adjustable distribution based on at least one adjustable input value;
comparing the metric with a corresponding reference value; and
adjusting the adjustable input value based on a result of said comparing so that the generated random numbers achieves a desired distribution;
wherein adjusting the adjustable input value based on said comparing comprises:
adjusting a dc offset value for generating an analog noise voltage to cause the generated random numbers to achieve a desired numeric mean; and
adjusting a reference voltage value to cause the generated random numbers to achieve a desired numeric range.

20. The medium of claim 19, wherein said metric includes a mean value.

21. The medium of claim 19, wherein said metric includes a standard deviation value.

22. The medium of claim 19, wherein said metric includes an entropy value.

23. The medium of claim 19, wherein said adjusting includes adjusting the adjustable input value through a linear algorithm.

24. The medium of claim 19, wherein said adjusting includes adjusting the adjustable input value through a nonlinear algorithm.

25. The medium of claim 19, wherein said adjusting includes adjusting the adjustable input value through an adaptive algorithm.

26. The medium of claim 19, wherein computing at least one metric based on the sample comprises:
computing a first metric representing a mean value of the random sample; and computing a second metric representing a standard deviation of the random sample.

27. The medium of claim 19, wherein the desired distribution is a Gaussian distribution having a mean value corresponding to a center value of a range for the random numbers.

28. A processor for implementing a method for adjusting randomly generated numbers, the method comprising:
   computing at least one metric based on a sample of randomly generated numbers having an adjustable distribution based on at least one adjustable input value;
   comparing the metric with a corresponding reference value; and
   adjusting the adjustable input value based on a result of said comparing so that the generated random numbers achieves a desired distribution;
   wherein adjusting the adjustable input value based on said comparing comprises:
   adjusting a dc offset value for generating an analog noise voltage to cause the generated random numbers to achieve a desired numeric mean; and
   adjusting a reference voltage value to cause the generated random numbers to achieve a desired numeric range.

29. The processor of claim 28, wherein said metric includes a mean value.

30. The processor of claim 28, wherein said metric includes a standard deviation value.

31. The processor of claim 28, wherein said metric includes an entropy value.

32. The processor of claim 28, wherein said adjusting includes adjusting the adjustable input value through a linear algorithm.

33. The processor of claim 28, wherein said adjusting includes adjusting the adjustable input value through a non-linear algorithm.

34. The processor of claim 28, wherein said adjusting includes adjusting the adjustable input value through an adaptive algorithm.

35. The processor of claim 28, wherein computing at least one metric based on the sample comprises:
   computing a first metric representing a mean value of the random sample; and
   computing a second metric representing a standard deviation of the random sample.

36. The processor of claim 28, wherein the desired distribution is a Gaussian distribution having a mean value corresponding to a center value of a range for the random numbers.

* * * * *